May 6, 1941.　　　　E. J. DILLMAN　　　　2,241,296

FUEL SUPPLY CONTROL MEANS

Original Filed Sept. 25, 1935

INVENTOR
Earnest J. Dillman
BY
Andrew K. Foulds
his ATTORNEY

Patented May 6, 1941

2,241,296

UNITED STATES PATENT OFFICE 2,241,296

FUEL SUPPLY CONTROL MEANS

Earnest J. Dillman, Detroit, Mich., assignor to Detroit Lubricator Company, Detroit, Mich., a corporation of Michigan Original application September 25, 1935, Serial No. 41,975. Divided and this application September 19, 1938, Serial No. 230,565

3 Claims. (Cl. 158—115)

My invention relates generally to heating systems and more particularly to fuel supply control means therefor.

One of the objects of my invention is to provide a new and improved fuel supply control system of the type having a thermostatic valve for controlling flow of fuel to a main burner, or burners, and to provide a control system for this purpose in which the temperature of the thermostatic element is controlled by the thermostatic valve so that the thermostatic valve has been opened, the thermostatic element will not be heated to temperatures in excess of that necessary to maintain the thermostatic valve in open position.

Another object of my invention is to provide a new and improved fuel supply control system of the above mentioned character in which the temperature of the heating means is controlled in such a manner as to obtain quick operation in the opening and closing of the thermostatic valve.

Another object of my invention is to provide a new and improved, thermostatically operated valve which has a quick opening and/or closing action without the use of snap-acting or other and similar mechanism designed to obtain a quick movement of the parts.

Another object of my invention is to provide means for shutting off the supply of fuel to the pilot or auxiliary burner upon manual shut off of the supply to the main burner.

The invention consists in the improved construction and combination of parts, to be more fully described hereinafter and the novelty of which will be particularly pointed out and distinctly claimed.

In the accompanying drawing, to be taken as a part of this specification, I have fully and clearly illustrated my invention, in which drawing—

Figure 1:
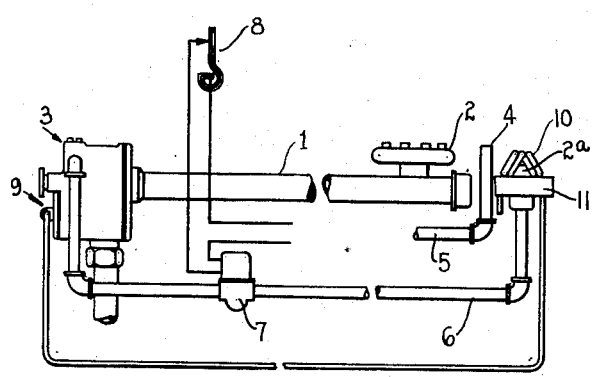
Figure 1 is a diagrammatic view of a fuel supply control system embodying my invention.

In Fig. 1 of the drawing there is shown a fuel supply control system which, in the present instance, is adapted for use with a gas burning type of heating system including a gas supply line or pipe in which there may be one or more main gas burners or heaters, as indicated at 2, the pipe 1 being connected to the usual source of supply. The fuel supply control system is adapted for controlling the supplying of fuel to the burner 2 and includes a heater or auxiliary burner 2ª.

In the gas supply line 1, between the source of supply and the main burner 2, there is a thermostatically operated control device or valve, designated in general by the numeral 3, and which controls flow of gas to the main burner 2 in response to the temperature of the auxiliary burner 2ª. The main burner 2 is intermittently operated in accordance with a demand for heat from a boiler, room, or other enclosed space to be heated, and is lighted by a constantly burning pilot light 4 when the thermostatically operated valve is in open position, permitting flow of gas to the main burner 2. The constantly lighted pilot 4 may be located adjacent to, and at one side of the main burner 2, as shown, and gas may be supplied thereto through a supply line or pipe 5 which may be connected to the source of gas supply in any suitable manner. The auxiliary burner 2ª is also preferably of the gas burning type and gas may be supplied thereto by means of a pipe or conduit 6 which, in the present instance, is connected, for communication with the source of gas supply, to the inlet side of the thermostatic valve casing. In the supply line 6, between the auxiliary burner 2ª and the thermostatically operated valve 3, there is preferably provided a control device 7 for controlling flow of fuel to the auxiliary burner 2ª, and the control device 7 may be a solenoid valve or any other suitable device. Controlling operation of the solenoid valve 7 and electrically connected thereto there is a thermostat 8 which may be located so as to be responsive to the temperature of a boiler, room, or other space to be heated. The solenoid valve 7, under control of the thermostat 8, opens or closes the fuel supply line to the auxiliary burner 2ª so that the auxiliary burner is supplied with fuel in accordance with the temperature of the thermostat.

The thermostatic valve 3 is actuated by a thermostatic power element, designated in general by the numeral 9. The thermostatic power element 9 includes a coil or conduit 10 containing a suitable expansible-contractible fluid such as aniline. Surrounding the tip of the auxiliary burner 2ª there is a supporting member 11 for supporting an end portion of the conduit 10 which is preferably coiled around the burner so that a relatively long portion of the conduit is in good heat transfer relation with the burner flame.

Referring now to my fuel flow control device which comprises a thermostatic valve, it is capable of quick opening or closing action in controlling the supplying of fuel to a burner and without the necessity of snap-acting mechanism. This results from the throttling of the fuel supply to the auxiliary or control pilot burner 2ª when the main burner valve is in open position so that the thermostatic bulb will cool quickly upon extinguishment of the pilot burner. Also, upon opening of the solenoid control valve 7, the bulb is quickly heated by the high flame at burner 2ª so that the main valve is opened quickly, the pilot flame being reduced when the main valve opens, as above noted. The control device 3 is a compact unit and includes a substantially rectangular shaped casing or body 12 which is preferably a casting, the casing as seen on the drawing having a top wall 13, bottom wall 14, side walls 15, 16, and end walls 17, 18. The end wall 17 is made relatively thick, as shown, to house mechanism which is to be hereinafter described. The casing has a recess defined by the top wall 13, bottom wall 14, side walls 15, 16, and the end wall 17, the recess being closed by a removable closure member or cover in the form of a plate 19 which may be attached to the casing by screws, or other suitable attaching means. The casing walls defining the recess, and the inner wall of the cover 19, cooperate to provide a chamber 20 through which the fuel passes enroute to the main burner or burners. In the bottom wall 14 there is provided an opening 21 leading into chamber 20, and which opening constitutes the inlet port. The inlet port is preferably defined by an externally extending tubular boss 22 which may be threaded for connection in the main fuel supply line. The outlet passage 23 from chamber 20 is through the removable cover plate 19. Preferably the outlet passage 23 is defined by an externally extending tubular member 24 which may be integral with the cover, as shown, and which may be sleeve-fitted or otherwise connected to the main supply line 1 leading to the main burner 2.

Figure 2:
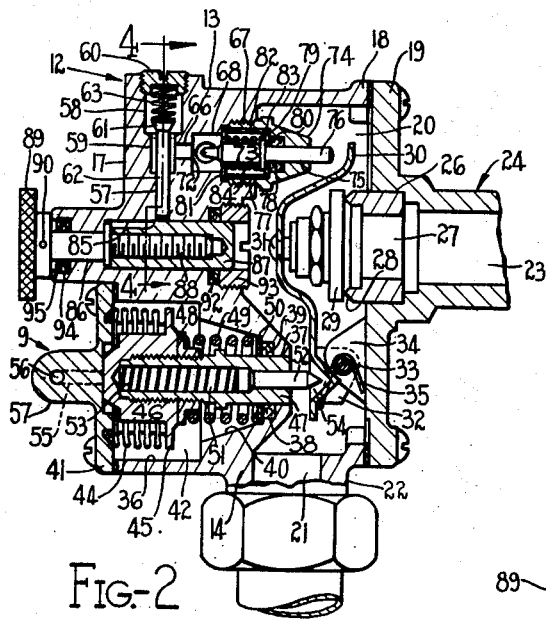
Fig. 2 is a view shown in vertical cross-section of a thermostatically operated control device employed in the system and embodying features of my invention.

The outlet passage 23 is preferably in the form of a bore having a counterbore 25 leading into chamber 20, providing an inwardly facing seating surface or shoulder in the cover plate 19. Disposed in the counterbore 25 and seating against the shoulder formed thereby there is a valve seat member 26 having a port 27 therethrough. The tubular valve seat member may be press-fitted in counterbore 25, or otherwise suitably secured to the cover plate 19. Preferably the valve seat member 26 projects into chamber 20 and has its inner end beveled, as at 28, the beveled end constituting a seat for a valve member 29. The valve member 29 is carried by a pivotal lever 30 and is preferably fixed thereto intermediate the ends of lever 30 by means of a rivet 31, or other suitable means. The lever 30 is pivotally mounted at its lower end to the removable cover plate 19 so that the lever and valve are readily removable, with the cover, as a unitary structure to permit ready access to the interior of the casing and to facilitate assembly of the device. Adjacent its lower end the pivotal lever 30 has substantially parallel, opposed flanges 32 projecting from the side edges of the lever and toward the cover 19. The flanges 32 are provided with aligned apertures to receive a pin or shaft 33 which is mounted in substantially parallel spaced lugs or ears 34 projecting from the inner wall of cover 19 and positioned between the flanges 32, there being only one of the lugs and one of the flanges shown. The shaft 33 serves as a fulcrum for the lever 30 so that the valve member 29 is pivotally supported for movement toward and from its seat. A spring 35 is provided and arranged to urge the valve member 29 toward closed position. The spring 35 may be coiled about the shaft 33, between the lugs 34, and be under tension with one of its end portions engaging the inner wall of cover 19 and the other of its end portions engaging the lever 30 at a point adjacent its lower end, and on the opposite side of the lever fulcrum from the valve member 29. Thus the spring 35 tends to pivot the lever 30 in a clockwise direction, as seen on the drawing, and towards its seat, and under certain conditions the spring holds the valve against its seat or in closed position, as shown in Fig. 2.

In the end wall 17, adjacent the bottom wall 14, there is provided an opening therethrough which is preferably defined by a number of axially aligned bores including a relatively large bore 36 leading out of the end wall 17, and a relatively small bore 37 which leads into chamber 20 and which is in alignment with the lever 30. Preferably the bore 37 is counterbored, as at 38, providing an outwardly facing annular shoulder 39, and connecting the counterbore 38 and the relatively large bore 36 there is a tapered bore 40. A closure member or cover in the form of a plate 41 is provided for closing the opening leading into the bore 36 and may be secured to the outer side of wall 17 by screws, or other suitable attaching means. The inner walls of the aligned bores, and the inner wall of the cover 41, cooperate to provide a chamber 42 in which is disposed an actuator or thermostatic power element for actuating the valve member 29. The thermostatic power element includes a tube or conduit 43 containing or charged with a suitable expansible-contractible fluid such as aniline, and also includes an expansible-collapsible member 44 which may be a substantially cylindrical, circumferentially corrugated, resilient, metallic bellows. One end of the bellows 44 is preferably hermetically sealed and secured to the inner wall of the cover 41. The other or free end of the bellows 44 is hermetically secured and sealed by a head member or end wall 45 which cooperates with the bellows and the cover 41 to provide an expansible chamber for containing the expansible-contractible fluid. The head member or end wall 45 preferably has an integral portion 46 which extends centrally through the bellows toward the cover 41, the end of the portion 46 being adapted to engage the cover 41 to limit collapse of the bellows 44. The head member 45 rigidly supports a plunger or operating member 47 which has one end preferably screw-threaded, or otherwise secured in a substantially cylindrical, internally threaded bore of the head member 45 and portion 46. The other end of the operating member 47 is reciprocally supported in the relatively small bore 37. Adjustably screw-threaded on the plunger member 47 there is an abutment member 48, preferably in the form of a sleeve having an annular flange against which is seated one end of a coil spring 49. The spring 49 surrounds the plunger member 47 and at its other end engages a packing disc or ring 50 seating on an annular shoulder formed between the tapered bore 40 and the counterbore 38. The counterbore 38 and the ring 50 cooperate to provide an annular packing material recess which surrounds plunger 47. The recess contains suitable packing material which serves to seal the bore 38 around the plunger 47, and which is held in the recess and under compression by the packing ring 50 and spring 49. The plunger member 47 has a longitudinal bore 51 in which an operating member 52 is reciprocally mounted. The operating member 52 projects from the end of the plunger member 47 and is normally held in its outward or extended position by a resilient cushioning spring 53 positioned in the bore 51. Outward movement of the member 52 is limited by a head portion cooperating with an annular shoulder in the bore 51. The member 52 projects into chamber 20 for cooperation with the lever 30 and is operable upon expansion of the bellows 44 to engage the lever 30 on the opposite side of the shaft 33 from the valve member 29. The member 52 is preferably provided with a conical end portion adapted to seat in a conical recess 54 formed in the lower end portion of the lever 30. Through the cover 41 there is a passage 55 which opens at one end into the bellows 44 and which, at its other end, opens into a passage 56 in a boss 56ª integral with and extending externally from the cover 41. The passage 56 communicates with the tube 43 which extends thereinto and which may be secured and sealed therein, in a fluid-tight manner, by solder or the like.

In the end wall 17 of the casing there is provided a vertically extending passage preferably provided by three axially aligned bores comprising a relatively small bore 57 and a relatively large bore 58 connected by a bore 59 of intermediate diameter. The relatively large bore 58 leads out of the top wall 13 and is preferably threaded for receiving a threaded closure plug 60. Between the intermediate bore 59 and the relatively large bore 58 there is formed an upwardly facing annular shoulder which constitutes a valve seat and which may be beveled to cooperate with the beveled or conical head 61 of a valve member. The valve member has a stem 62 which extends downwardly and into the small bore 57, the bore 57 serving as a guideway for the reciprocal valve member. A coil spring 63 is provided for urging the valve member toward closed position and is disposed in bore 58 with one of its ends bearing against the inner end of closure plug 60 and with the other end bearing against the upper face of the valve head 61. Leading out of bore 58 (Figs. 4 and 5) there is a laterally extending bore or outlet passage 64 which leads into a larger bore 65. The bore 65 is internally threaded for connection with a pipe or conduit 6 which leads to the auxiliary burner 2ª via the solenoid valve 7. In the wall 17 there is provided a horizontally extending passage provided by a number of axially aligned bores including a relatively small bore 66 leading into vertical bore 59, and a relatively large bore 67 leading into chamber 20, the bores 66 and 67 being connected by a bore 68 of intermediate diameter. Through the side wall 15 and leading into intermediate bore 68 there is an inlet passage for fuel, and which comprises a large bore 69 connected to bore 68 by a relatively small bore 70. The bore 69 may be threaded for connection to a pipe or conduit 71 which leads from the source of gas supply. The relatively small bore 66 constitutes the valve port and the circumferential edge 72, formed by the inwardly facing shoulder between bores 66 and 68, serves as a valve seat for cooperating with the conical end of a valve member 73. The relatively large bore 67 is threaded to receive a supporting member 74 for supporting the valve member 73, one end of the supporting member projecting into chamber 20 in alignment with the lever 30 adjacent its upper end. The valve supporting member 74 is tubular in form having a relatively small bore 75 leading out of one end into chamber 20. The valve member 73 has a stem portion 76 which extends into and is reciprocally guided in bore 75. An end portion of stem 76 projects into chamber 20 for operative engagement with the pivotal lever member 30 adjacent its upper end. The supporting member 74 has a relatively large bore 77 which leads out of its other end into bore 68 and which is connected to bore 75 by a bore 78 which is of intermediate size relative to bores 75 and 77. Seated on the annular shoulder formed between bores 77 and 78 there is a packing ring 79 having a central aperture therethrough for receiving the valve stem 76, the packing ring and bore 78 providing an annular chamber around the valve stem for containing packing material, as at 80. On the inwardly facing annular shoulder formed between bores 68 and 67 there is a washer 81, the washer being engaged around its outer periphery by the inner end of the valve supporting member 74 and tightly held in position thereby. Sleeve-fitted in the larger bore 67 of the member 74 there is a tubular spacer member 82 having its opposite ends engaging the packing ring 79 and the washer 81 at their outer peripheries. The valve member 73 has an externally extending annular flange 83 within the spacer member 82 for engaging packing rings 79 to restrict movement of the valve in a valve opening direction. Within spacer member 82 and surrounding the valve member 73 there is a coil spring 84. The coil spring 84 has one end engaging the annular flange 79 and the other end engaging the washer 83, the spring being under compression and tending to move the valve member toward open position.

Figure 4:
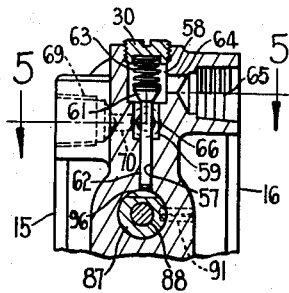
Fig. 4 is a view shown in cross-section taken along the line 4—4 of Fig. 2.
Figure 5:
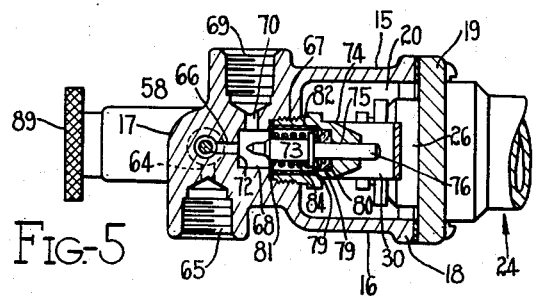
Fig. 5 is a view in cross-section taken along the line 5—5 of Fig. 4.
Figure 3:
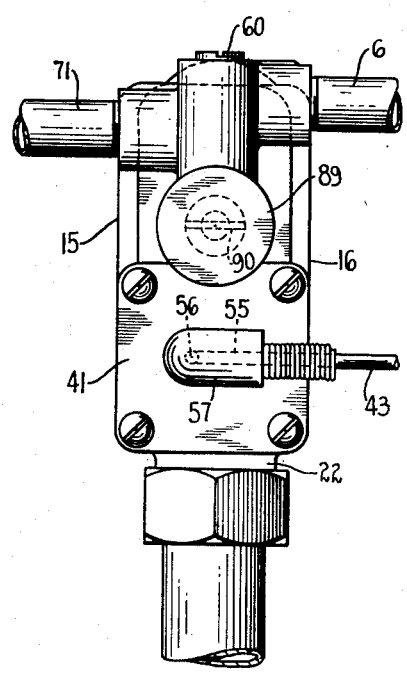
Fig. 3 is an end view in elevation looking from left to right facing Fig. 2.

Centrally through the end wall 17 and in axial alignment with valve member 29 there is provided a passage comprising a relatively large bore 85 which leads into chamber 20, and a relatively small bore 86 in axial alignment with bore 85 and which leads out of the end wall 17. A cylindrical member 87 is slidably disposed in bore 85 and has a central, longitudinally extending bore which is threaded to receive a threaded shaft 88 of a manual adjustment member. The shaft 88 extends through the relatively small bore 86 and has an end portion thereof projecting externally of the casing. A gripping knob 89 is secured to the outer projecting end portion, such as by means of a pin 90. In the slidable member 87 there is provided a longitudinally extending slot or keyway for receiving a pin or key 91 (Fig. 4). To prevent the escape of gas from chamber 20 through bore 85, the bore may be counterbored at its inner end to provide an annular chamber surrounding member 87 for containing packing material, as at 92. A packing nut 93 having a central aperture therethrough for receiving the member 87 may be provided to compress the packing material. Similarly the bore 86 may be counterbored for containing packing material, as at 94, which may be held under compression by a packing ring 95.

The slidable member 87 is provided with a flat, upwardly facing portion, as at 96, forming a slot which preferably extends from the outer end of member 87 inwardly to a point intermediate its ends, at which point it runs out in an upward curved cam surface to the circumferential periphery of the member 87. The vertically extending bore 57 leads into the horizontal bore 85 and when the slidable member 87 is in the position shown in Fig. 2, the lower end of valve stem 62 rests on the circumferential periphery of member 87. By means of the manually operable knob 89 the slidable member may be advanced to position its inner end in engagement with the lever 30 to thus positively hold the valve member 29 against its seat, or in closed position. When the slidable member is moved to hold the main valve member 29 in closed position, it will be seen that the end of valve stem 62 will be seating on the flat portion 96 and the valve head 61 will be held tightly against its seat by spring 63. Thus when it is desired to positively shut off flow of gas to the main burner 2 and to the auxiliary burner 2ª, the knob 89 is rotated in one direction and by this single adjustment means both valves are positively closed.

The operation of the above described control device is as follows: When it is desired to start the heating system the slidable member 87 is retracted, to the position shown, by rotating the knob 89. The valve member 29 is then free to be operated by the thermostatic power element. As the slidable member 87 is retracted, the cam surface of slot 96 engages the valve stem 62 to move the valve member 61 upwardly against the force of spring 63 until the lower end of the valve stem rests on the circumferential surface of member 87. The valve 73 being held in its maximum open position by its spring, a large quantity of fuel flows to the auxiliary or pilot burner 2ª which produces a high flame that quickly heats the expansible-contractible fluid of the thermostatic power element to the temperature necessary to cause valve 29 to be opened quickly. The heating of the expansible-contractible fluid causes it to expand the bellows 44 so that the member 52 carried by the movable wall of the bellows engages the lower end of lever 30 pivoting the same in a counterclockwise direction. As the lever 30 is pivoted in a counterclockwise direction, the valve 29 is moved away from its seat permitting flow of gas to the main burner. Upon a predetermined movement of lever 30 its upper end engages the inwardly projecting end of stem 76 of valve member 73 and continued movement of lever 30 results in the valve member 73 being moved toward closed position. As the valve member 73 is moved toward its seat 72, the quantity of gas flowing to the auxiliary burner is decreased so that the heating of the thermostatic bulb is correspondingly decreased. Thus after the valve 29 has been opened, the thermostatic power element will act through the valve lever to throttle the valve member 73 so that the temperature of the expansible-contractible fluid will be maintained just slightly above that which would cause the valve 29 to close, so that when the solenoid valve stops flow of gas to the auxiliary burner the valve 29 will close substantially immediately thereafter.

From the foregoing description it will now be appreciated that I have provided fuel supply control systems in which the operation of a valve is controlled in a new and novel manner whereby the valve has a quick action both in its opening and closing movements to control flow of gas to a burner. It will also be seen that the above-mentioned valve has a quick opening or closing action without the use of snap-acting or similar mechanism. In addition, I have provided a thermostatically operated control device having a main valve controlling flow of gas to a main burner, and a second valve controlling flow of gas to an auxiliary burner, both of which valves may be positively held in closed position by the operation of a single manual adjustment member.

This application is a division of my copending application, Serial No. 41,975, filed September 25, 1935, for Fuel supply control systems.

What I claim and desire to secure by Letters Patent of the United States is:

1. In a control device for fluid fuel, a main burner, a main valve member operable to supply fuel to said burner, a pilot burner, valve means controlling flow of fuel to said pilot burner and having a stem portion, a manually operable reciprocal member operable to move said main valve member to stop flow of fuel to said main burner, said reciprocal member having a cam surface engageable with said valve means stem portion, and means urging said stem portion into engagement with said cam surface and operable on said valve means to cut-off flow of fuel to said pilot burner upon movement of said reciprocal member to cut-off flow to said main burner.

2. In a control device, a casing having a passageway through a wall thereof for flow of fluid, a valve member in said casing for controlling said passageway and biased toward closed position, said casing having a second passageway through a wall thereof for flow of fluid, a valve member in said casing and controlling said second-named passageway and biased toward closed position, and a manually operable member wholly within said casing and in alignment with and having one end arranged to abut and to close said first-named valve member, said second-named valve member being movable transverse to the direction of movement of said manually operable member and having a stem portion abutting the side wall of said manually operable member, said manually operable member having a depression in its side wall to receive said stem portion, said manually operable member being operable in one position to hold said second-named valve member in an open position and being operable on movement to close said first-named valve member to release said second-named valve member for movement into said depression so that said second-named valve member can move to closed position.

3. In a control device for fluid fuel, a casing having a first passageway therethrough for flow of fuel, a valve member in and controlling flow of fuel through said passageway, a second passageway in said casing opening into said first passageway, a third passageway through said casing for the flow of fuel, a fourth passageway in said casing opening into said third passageway and opening through a side wall of said second passageway, a longitudinally movable member reciprocal within said second passageway and having a portion extending into said first passageway and engageable with said valve member to stop flow of fuel, said movable member having a cam surface adjacent said fourth passageway opening, and a valve member within said third passageway controlling flow of fuel therethrough and having a stem portion extending through said fourth passageway and into engagement with said cam surface, said cam surface being cooperable with said stem portion to allow said last-named valve member to stop flow of fuel when said movable member is in a position to stop flow of fuel through said first passageway.

EARNEST J. DILLMAN.